United States Patent
Millerd

(10) Patent No.: US 12,216,051 B2
(45) Date of Patent: Feb. 4, 2025

(54) DYNAMIC PHASE-SHIFT INTERFEROMETER UTILIZING A SYNCHRONOUS OPTICAL FREQUENCY-SHIFT

(71) Applicant: Onto Innovation Inc., Wilmington, MA (US)

(72) Inventor: James Millerd, Tucson, AZ (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 17/581,534

(22) Filed: Jan. 21, 2022

(65) Prior Publication Data

US 2023/0236125 A1 Jul. 27, 2023

(51) Int. Cl.
*G01N 21/45* (2006.01)
*G01N 21/21* (2006.01)

(52) U.S. Cl.
CPC ............. *G01N 21/45* (2013.01); *G01N 21/21* (2013.01); *G01N 2201/06113* (2013.01)

(58) Field of Classification Search
CPC .................... G01N 21/45; G01N 21/21; G01N 2201/06113
See application file for complete search history.

(56) References Cited

U.S. PATENT DOCUMENTS

| | | | |
|---|---|---|---|
| 4,120,587 A * | 10/1978 | Vali | G01C 19/66 372/6 |
| 4,159,178 A * | 6/1979 | Vali | H01S 3/302 356/461 |
| 4,575,248 A | 3/1986 | Horwitz et al. | |
| 4,606,638 A | 8/1986 | Sommargren | |
| 4,624,569 A | 11/1986 | Kwon | |
| 4,872,755 A | 10/1989 | Kuchel | |
| 5,453,814 A * | 9/1995 | Aiyer | G03F 7/70208 355/70 |
| 5,589,938 A | 12/1996 | Deck | |

(Continued)

OTHER PUBLICATIONS

Hettwer, Andrea et al., "Three channel phase-shifting interferometer using polarization-optics and a diffraction grating," Opt. Eng. 39(4) pp. 960-966 (Apr. 2000).

(Continued)

*Primary Examiner* — Violeta A Prieto
(74) *Attorney, Agent, or Firm* — Paradice & Li LLP

(57) ABSTRACT

An optical metrology device characterizes a test object using a phase shift interferometer with synchronous time varying optical frequency shifts. A light source generates a beam having a time varying frequency, which is divided into two collinear, orthogonally polarized beams that differ by a first frequency shift. One or more optical cavities receive the beams and produce a pair of reference beams that differ from each other in frequency by the first frequency shift and a pair of test beams with a second frequency shift induced by the one or more optical cavities. The test beams differ from each other by the first frequency shift and differ from the reference beams by the second frequency shift. The first frequency shift has a pre-defined relationship with respect to the second frequency shift to generate interference between a reference beam and test beam that have frequency shift magnitudes with the pre-defined relationship.

22 Claims, 7 Drawing Sheets

(56) References Cited

U.S. PATENT DOCUMENTS

| | | |
|---|---|---|
| 5,663,793 A | 9/1997 | de Groot |
| 5,777,741 A | 7/1998 | Deck |
| 5,883,717 A | 3/1999 | DiMarzio et al. |
| 6,304,330 B1 | 10/2001 | Millerd et al. |
| 6,552,808 B2 | 4/2003 | Millerd et al. |
| 6,717,680 B1 | 4/2004 | Kuchel et al. |
| 6,847,457 B2 | 1/2005 | Tobiason et al. |
| 6,850,329 B2 | 2/2005 | Tobiason et al. |
| 7,057,738 B2 | 6/2006 | Millerd et al. |
| 7,230,717 B2 | 6/2007 | Brock et al. |
| 7,230,718 B2 | 6/2007 | Millerd et al. |
| 7,675,628 B2 | 3/2010 | Millerd et al. |
| 7,948,633 B2 | 5/2011 | Froggatt et al. |
| 8,345,258 B2 | 1/2013 | Millerd et al. |
| 8,705,046 B2 | 4/2014 | Yun et al. |
| 9,696,133 B2 | 7/2017 | Yuan et al. |
| 10,739,197 B2 | 8/2020 | Lucey |
| 2005/0046865 A1 | 3/2005 | Brock et al. |
| 2005/0200856 A1 | 9/2005 | Groot |
| 2006/0158657 A1* | 7/2006 | De Lega ............ G01B 9/02084 356/497 |
| 2008/0117436 A1 | 5/2008 | Altenberger et al. |
| 2010/0134801 A1* | 6/2010 | Millerd .............. G01B 9/02065 356/492 |
| 2014/0071436 A1* | 3/2014 | Cyr ...................... G01M 11/335 356/73.1 |
| 2017/0373462 A1* | 12/2017 | Guzman ................. H01S 5/183 |
| 2019/0025431 A1* | 1/2019 | Satyan .................. G01S 7/4914 |

OTHER PUBLICATIONS

Barrientos Garcia, Bernardino, "Transient deformation measurement with electronic speckle pattern interferometry by use of a holographic optical element for spatial phase stepping," Applied Optics, vol. 38, No. 28, Oct. 1, 1999, pp. 5945-5947.

Koliopoulos, Chris, "Simultaneous phase-shift interferometer," "Simultaneous phase-shift interferometer," Proc. SPIE 1531, Advanced Optical Manufacturing and Testing II, (Jan. 1, 1992); doi: 10.1117/12.134852.

Kothiyal, Mahendra P., "Shearing interferometer for phase shifting interferometry with polarization phase shifter," Applied Optics, Vo. 24, No. 24, Dec. 15, 1985, pp. 4439-4442.

Smythe, R., "Instantaneous phase measuring interferometry," Optical Engineering, vol. 23, No. 4, Jul./Aug. 1984, pp. 361-364.

* cited by examiner

DYNAMIC PHASE-SHIFT INTERFEROMETER UTILIZING A SYNCHRONOUS OPTICAL FREQUENCY-SHIFT

FIELD OF THE DISCLOSURE

Embodiments of the subject matter described herein are related generally to optical metrology and more specifically to interferometers for optical testing.

BACKGROUND

Semiconductor and other similar industries often use optical metrology equipment to provide non-contact evaluation of substrates during processing. With optical metrology, a sample under test is illuminated with light, e.g., at a single wavelength or multiple wavelengths. After interacting with the sample, the resulting light is detected and analyzed to determine a desired characteristic of the sample.

One type of optical metrology that may be used to characterize the composition and phase of a materials is phase shift interferometry. Phase-shift interferometry is an established method for measuring a variety of physical parameters ranging from the density of gases to the displacement of solid objects. An interferometric wavefront sensor employing phase-shift interferometry typically consists of a temporally coherent light source that is split into two wavefronts, a reference and test wavefront, which are later recombined after traveling different path lengths. The relative phase difference between the two wavefronts is manifested as a two-dimensional intensity pattern known as an interferogram. Phase-shift interferometers typically have an element in the path of the reference wavefront to introduce three or more known phase-steps or phase-shifts. By detecting the intensity pattern with a detector at each of the phase shifts, the phase distribution of the object wavefront can be quantitatively and rapidly calculated independent of the irradiance in the reference or object wavefronts.

Phase-shifting of the images can either be accomplished by sequentially introducing a phase-step (temporal phase-shifting), by splitting the beam into parallel channels for simultaneous phase-steps (parallel phase-shifting), or by introducing a high frequency spatial carrier on to the beam (spatial carrier phase-shifting). Parallel and spatial phase-shifting achieve data acquisition times several orders of magnitude less than temporal phase-shifting, and thus offers significant vibration immunity.

Interferometers which have the test and reference surface located along the same optical axis (commonly known as Fizeau interferometers) offer advantages over other types of interferometers because they can be configured so that there are no elements between the test and reference surface. The Fizeau interferometer only requires one precision surface, which leads to reduced manufacturing costs. Integrating a Fizeau interferometer with parallel or spatial phase-shifting techniques has proven difficult due to the need to encode opposite polarizations from reflections off nominally common optical path components and a desire not to alter the surfaces or introduce an intra-cavity element. An improved phase measurement system compatible with a Fizeau interferometer is desired.

SUMMARY

An optical metrology device characterizes a test object using a phase-shift interferometer with a polarization frequency-shifting element to use synchronous time varying optical frequency shifts. A tunable light source generates a beam having a time varying frequency, which is divided into two collinear, orthogonally polarized beams having respective frequencies that differ by a first frequency shift. One or more interferometer optical cavities receive the beams and produce a pair of reference beams from a reference path and a pair of test beams from a test path. The pair of reference beams differ from each other in frequency by the first frequency shift. The test path induces a second frequency shift on the pair of test beams, which differ from each other in frequency by the first frequency shift, and differ from the pair of reference beams in frequency by the second frequency shift. The first frequency shift is controlled to have a pre-defined relationship with respect to the second frequency shift, e.g., over the integration time of the detector, such that a polarization phase sensor detects an interferogram produced by a reference beam and test beam that are orthogonally polarized with respect to each other and have frequency shift magnitudes with the pre-defined relationship.

In one implementation, an optical device for characterizing a test object includes a tunable light source that is controlled to generate input light having a time varying frequency. The optical device further includes a polarization frequency-shifting element that receives the input light and that is controlled to generate two beams that are orthogonally polarized and have respective frequencies that differ from each other by a first frequency shift. One or more optical cavities receive the two beams. The one or more optical cavities includes a reference path that is traversed by portions of each of the two beams to produce a pair of reference beams that are orthogonally polarized and differ from each other in frequency by the first frequency shift. The one or more optical cavities further includes a test path is traversed by other portions of each of the two beams to produce a pair of test beams that are orthogonally polarized and differ from each other in frequency by the first frequency shift. The test path induces a second frequency shift on the pair of test beams so that the pair of test beams differ from the pair of reference beams in frequency by the second frequency shift, wherein the first frequency shift is controlled by the polarization frequency-shifting element to have a pre-defined relationship with respect to the second frequency shift. A polarization phase sensor receives the pair of reference beams combined with the pair of test beams and detects an interferogram produced by a reference beam and test beam that are orthogonally polarized with respect to each other and that have frequency shift magnitudes with the pre-defined relationship.

In one implementation, a method of characterizing a test object includes generating input light having a time varying frequency with a tunable light source. The method further includes generating from the input light two beams that are orthogonally polarized and have respective frequencies that differ from each other by a first frequency shift with a polarization frequency-shifting element that receives the input light. The two beams are received with one or more optical cavities. The one or more optical cavities includes a reference path that is traversed by each of the two beams to produce a pair of reference beams that are orthogonally polarized and differ from each other in frequency by the first frequency shift. The one or more optical cavities further includes a test path that is traversed by each of the two beams to produce a pair of test beams that are orthogonally polarized and differ from each other in frequency by the first frequency shift. The test path induces a second frequency shift on the pair of test beams so that the pair of test beams differ from the pair of reference beams in frequency by the second frequency shift. The first frequency shift is controlled by the polarization frequency-shifting element to have a pre-defined relationship with respect to the second frequency shift. The method further includes receiving with a polarization phase sensor the pair of reference beams combined with the pair of test beams and detecting an interferogram produced by a reference beam and test beam that are orthogonally polarized with respect to each other and that have frequency shift magnitudes with the pre-defined relationship.

In one implementation, an optical device for characterizing a test object includes a means for generating input light having a time varying frequency. The optical device further includes a means for generating from the input light two beams that are orthogonally polarized and have respective frequencies that differ from each other by a first frequency shift and a means for receiving the two beams with the one or more optical cavities. The one or more optical cavities includes a reference path that is traversed by each of the two beams to produce a pair of reference beams that are orthogonally polarized and differ from each other in frequency by the first frequency shift. The one or more optical cavities further includes a test path that is traversed by each of the two beams to produce a pair of test beams that are orthogonally polarized and differ from each other in frequency by the first frequency shift. The test path induces a second frequency shift on the pair of test beams so that the pair of test beams differ from the pair of reference beams in frequency by the second frequency shift. The first frequency shift is controlled by the polarization frequency-shifting element to have a pre-defined relationship with respect to the second frequency shift. The optical device includes a means for receiving the pair of reference beams combined with the pair of test beams and detecting an interferogram produced by a reference beam and test beam that are orthogonally polarized with respect to each other and that have frequency shift magnitudes with the pre-defined relationship.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the many ways in which the invention may be practiced.

DETAILED DESCRIPTION

Figure 1A:
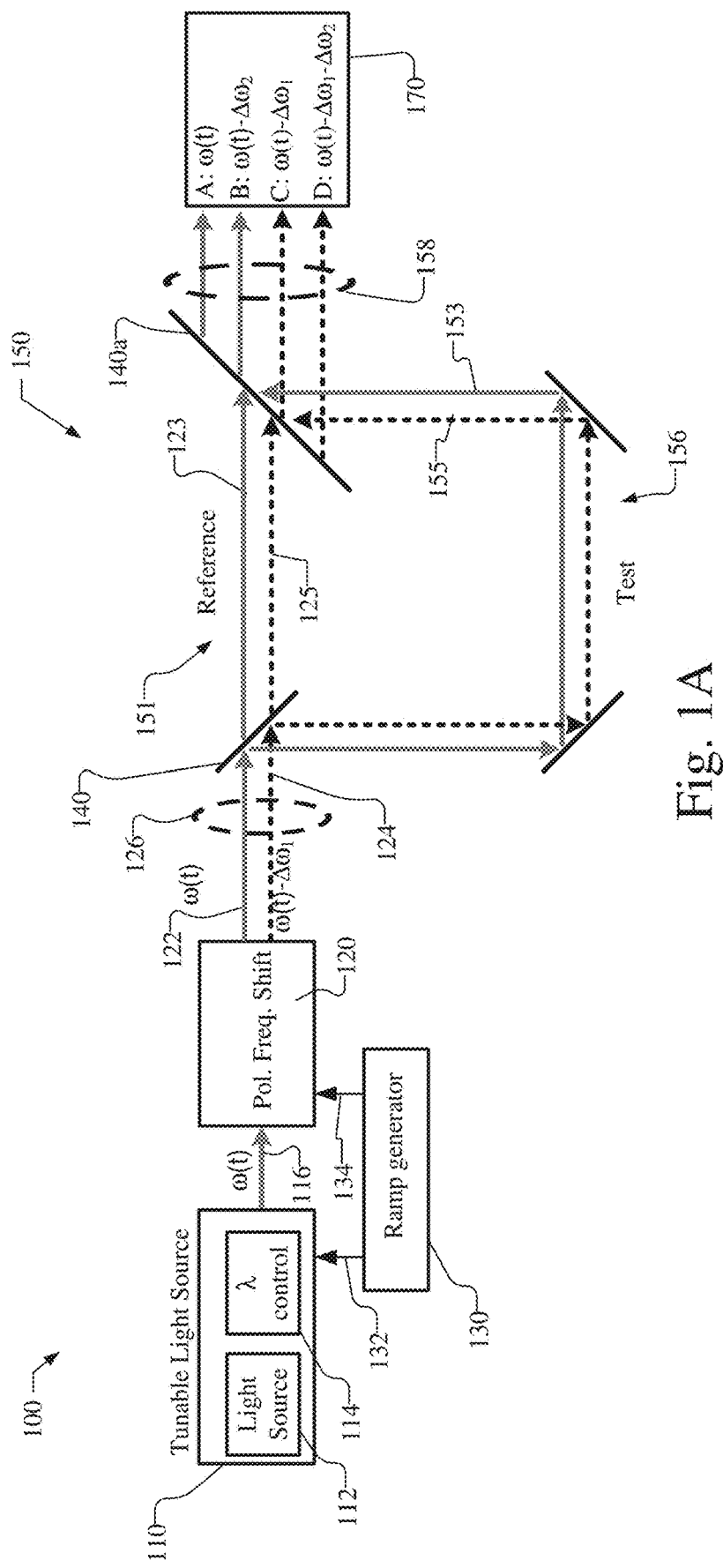
FIG. 1A is a schematic representation of an optical interferometer with one or more optical cavities for characterizing a test object.

During fabrication of semiconductor and similar devices it is sometimes beneficial to monitor the fabrication process by non-destructively measuring the devices in reflection or transmission. Optical metrology is sometimes employed for non-contact evaluation of samples during processing.

Phase-shift interferometry may be used to characterize the composition and phase of a materials. One type of metrology device that may be used for phase-shift interferometry is a Fizeau interferometer. Fizeau interferometers may have various configurations. For example, a Fizeau type interferometer may be used for an absolute distance measurement that uses a thin-film polarization reflection coating to separate the object and reference beams. However, the thin-film coating requires the incident and reflected wavefronts to be at a significant angle with respect to each other and only works over a narrow wavelength band. This significantly restricts the range at which the test optic can be placed, requiring the test and reference to be in contact to avoid spatial separation between the wavefronts. In addition, it requires alteration of the cavity surfaces.

Another Fizeau interferometer integrates a parallel phase-shifting sensor and employs tilt in the Fizeau interferometer cavity to either spatially separate the orthogonal polarization components for filtering on the receiving end, or to recombine orthogonal polarization components that were launched at different angles into the cavity. Introducing tilt in the Fizeau cavity to separate or combine the two polarization components, however, has several undesirable consequences. First, the separate paths taken by the two polarizations can introduce aberrations into the measurement, particularly when using spherical reference optics. Secondly, it is necessary to spatially filter the beams at the imaging end to block unwanted polarizations. This reduces the number of tilt fringes that can be measured as well as the quality of the image.

A Fizeau interferometer may use orthogonally polarized reference and test beams in a Fizeau cavity without using tilt. By introducing an optical delay device in the measurement portion of the interferometer and judiciously selecting the coherence length of the light, the length of the delay path, and the length of the gap in the Fizeau cavity, two coherent test and reference beams as well as two incoherent beams are produced simultaneously. The delay device is used to vary the optical path difference between the two orthogonally polarized beams to ensure that they are still coherent with each other after the delay in the Fizeau cavity. Such an approach, however, requires fine adjustment of the length of the delay path, which is expensive and time consuming to implement.

A spatial phase-shifting sensor may be integrated with a Fizeau interferometer using a tilted beam arrangement with a long coherence source, or an on-axis arrangement with a short coherence, respectively. While the combination of the spatial phase-shift sensor with either the tilted beam Fizeau or delay-line Fizeau significantly extends the capability of each instrument, it does not overcome the inherent disadvantages of each.

A Fizeau interferometer may use an integrated polarization phase-shifting sensor and a long coherence beam that operates on-axis and relies on synchronized phase modulation of the partially reflective reference optic and a polarization phase shifting module. The need to rapidly move the partially reflective optic to impart phase-modulation presents several practical difficulties. The optics must be translated over many microns of displacement without tilting, which is particularly difficult with optics greater than 100 mm in diameter or low f-number transmission spheres that contain multiple heavy glass elements. Additionally, the coupling of the polarization phase-shifting element with the reference element requires precision alignment within the interferometer and prohibits use with large or remotely located beam expanders.

Each of the above described Fizeau interferometers suffers from one or more short comings. The Fizeau interferometer, as described herein, provides a phase measurement without suffering from the shortcomings found in systems using, e.g., tilted beam, the short coherence approach, or the requirements of rapid translation of the reference optic.

As described herein, an optical device includes one or more optical cavities to characterize a test object. While the present disclosure discusses Fizeau interferometer as one suitable implementation, it should be understood that other types of devices, may be used in other implementations. For example, the one or more optical cavities can be formed in a variety of configurations including a configuration with multiple optical cavities such as used with a Twyman-Green interferometer, Mach-Zehender interferometer, or Michelson interferometer, or a configuration with one optical cavity, e.g., where the reference and test optical surfaces are displaced on a single optical axis, such as with a Fizeau interferometer. As discussed herein, the optical device may be capable of quantitative measurement in a single shot (one camera frame integration time), without the need for tilt between beams within the cavity, the use of short coherence length sources, or rapid mechanical translation of the reference surface. A tunable laser may have a coherence length equal to or longer than optical cavity, and is frequency modulated in time with, for example, a ramp function that causes a linear change in wavelength with time. The frequency modulated beam is launched into a polarization frequency shift device that divides the beam into orthogonally polarized beams and applies a frequency shift, e.g., a fixed frequency shift, to one or both of the beams to produce a known frequency shift between the two beams. The two beams may be combined to become overlapped and collinear. The combined beam may be provided to a polarization preserving fiber optic cable for remote delivery and expansion. The combined beam may be provided into one or more optical cavities that includes a reference path and a test path. For example, the reference path may be formed by an at least partially reflective reference surface, sometimes referred to as a transmission flat or transmission sphere through which portions of the beams traverse. The test path, for example, may be a test cavity through which other portions of the beams traverse. The reference surface and test cavity designations are from a typical use case; however, in practice the actual part under test may be either a component reflecting light from the test cavity, the reference optic or an optical system inserted within the test cavity.

Portions of the combined beam, having two polarization components, traverses the reference surface and the test path, resulting in at least four beams which are combined and further imaged onto a polarization phase sensor. The polarization frequency shift produced by the polarization frequency shift device is controlled to produce have a pre-defined relationship with the frequency shift caused by the delay due to propagation through the test path. By controlling the polarization frequency shift to have the pre-defined relationship to that of the delayed beam, a stable interference pattern will be produced in the polarization phase sensor, during the integration time of the sensor, from only two of the four returned beams: one beam from the partially reflective reference surface having a predetermined polarization, and the other beam from the test cavity having the orthogonal polarization. By way of example, the pre-defined relationship may be a match between the frequency shift magnitudes. The frequency shift magnitudes, for example, may closely match, e.g., with zero or little difference between frequency shifts, or may match within a predetermined amount, e.g., with an offset. It should be understood that the match need not be an exact match, but should not substantially change over the integration time of the sensor. By way of example, the pre-defined relationship may be a frequency shift match that is approximately within a kilohertz. The presence of an offset may be desirable to provide a stable reference for locking or bias for rejection of background light signals, but this may depend on various factors including the integration time of the sensor. The pre-defined relationship, for example, may be based on the relationship that is sufficient to produce a desired contrast, e.g., 5% or more, in the resulting interference fringes in an interferogram over the integration time of the sensor. Interference from the other beams produce a high frequency interference pattern that will wash-out during typical integration times of CMOS or CCD cameras and simply increase the background signal. Thus, the system functions as a long-coherence, on-axis, single-shot, polarization phase-shifting interferometer. Precise path-matching over long distances within the interferometer or rapid translation of the partially reflective reference optic is not required. The system may be scaled to large apertures with the introduction of a beam expander and used with remote optical cavities.

In one implementation, the polarization frequency-shifting device may be produced using a mirror mounted on a linear transducer such as a piezo-electric stack or voice-coil. A cat-eye or corner cube retroreflector may be used in the polarization frequency-shifter to ensure the beams are always co-aligned regardless of small fluctuations on the input beam.

In one implementation, the frequency caused by the optical cavity delay may be directly measured using a high-speed photodetector located at the focus of the returned beams in the imaging section and one of the beams is blocked in the polarization frequency-shifting device. The fixed frequency produced by the polarization frequency-shifting device may be periodically measured and tuned by blocking the return beam using the same high-speed photodetector. An electronic feedback loop may be established by adjusting either a laser drive signal, the polarization frequency-shifting device or both. In another implementation, a high-speed photodetector may be placed in the source module to actively monitor the polarization frequency-shifting device.

In one implementation, an acousto-optic modulator may be used in double-pass to generate a frequency shifted beam. In a further implementation, two acousto-optic modulators may be used in series to produce a frequency shifted beam.

In one implementation, where multiple reflecting surfaces are present within the test cavity, the frequency matching may be configured so that one of the surface reflections is preferentially selected.

In one implementation, two measurements may be made, each with the same frequency matching magnitude but opposite sign, said measurements further differenced within software, in order to uniquely isolate and measure the birefringence within the test cavity.

Figure 1B:
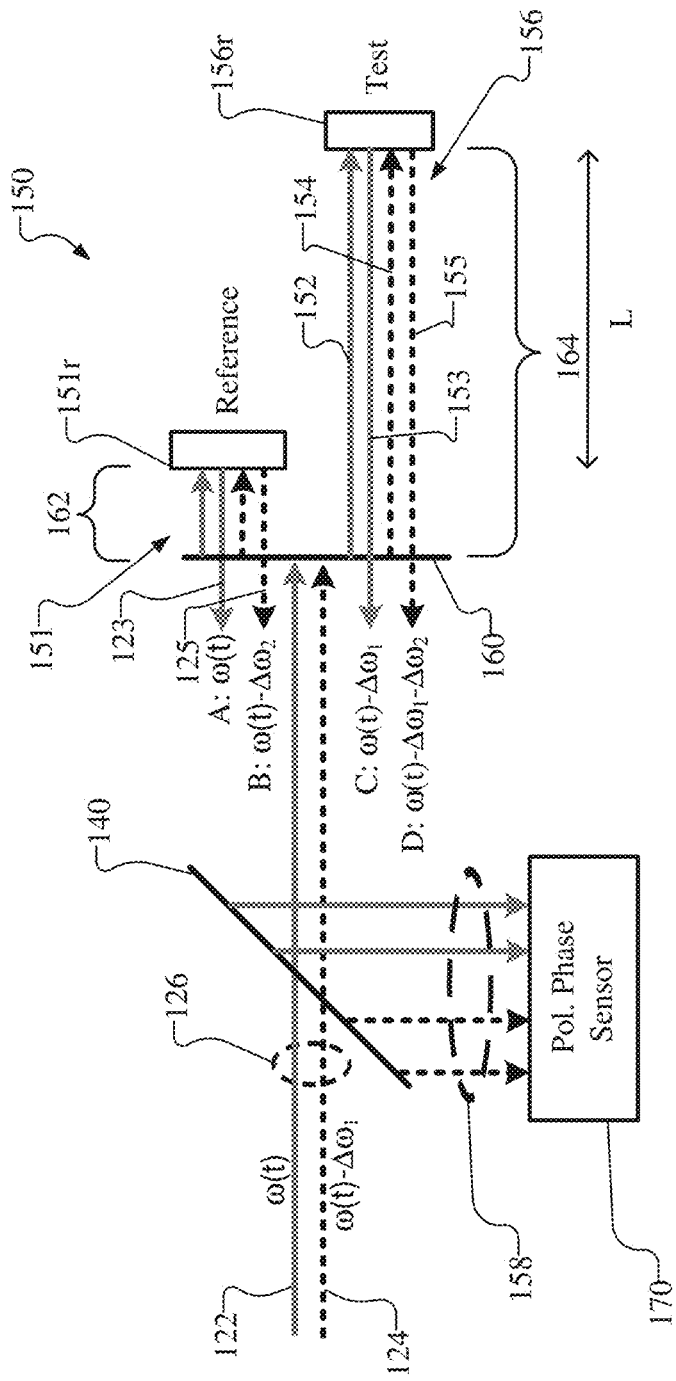
FIG. 1B is a schematic representation of one implementation of multiple optical cavity for testing.
Figure 1C:
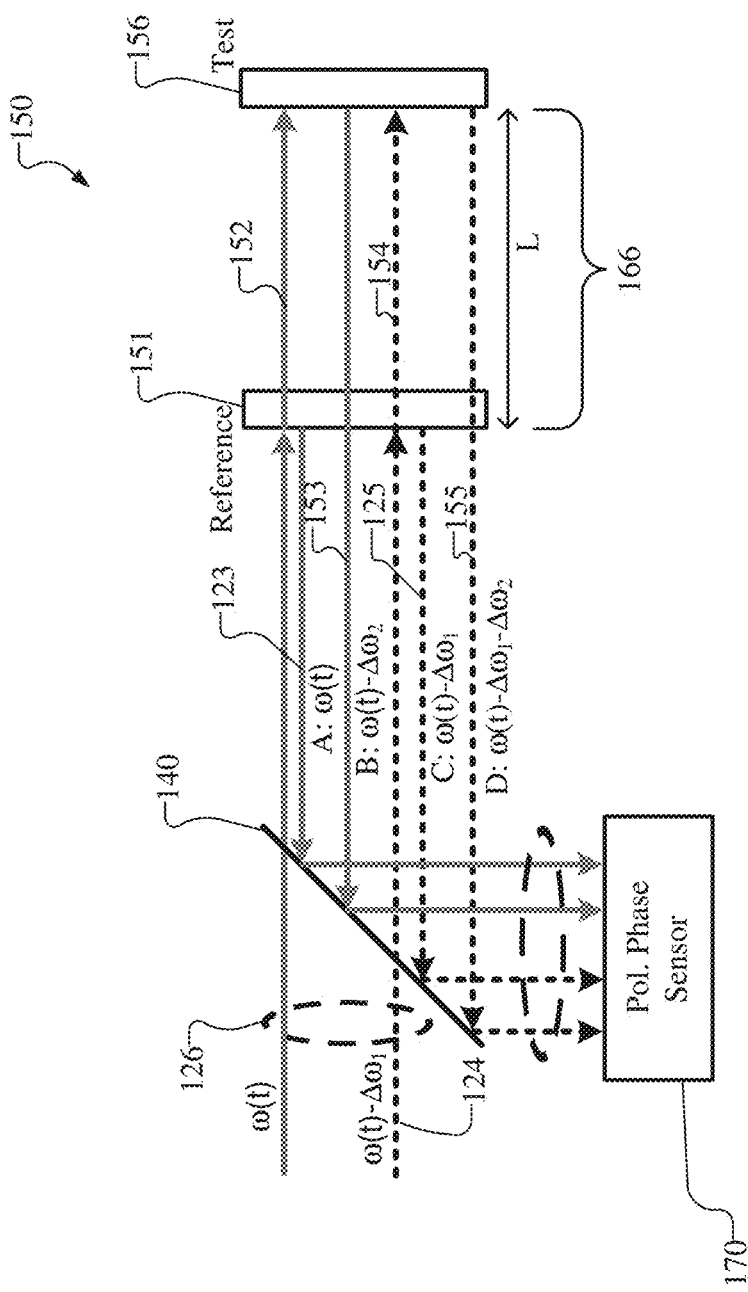
FIG. 1C is a schematic representation of one implementation of a single optical cavity for testing.

FIG. 1A illustrates an optical metrology device 100 configured for characterizing a test object using phase-shift interferometry with using one or more optical cavities 150 that include a reference path 151 and a test path 156. It should be understood that FIG. 1A illustrates the one or more optical cavities 150 as including two separate paths for the reference path 151 and the test path 156, but in some implementations, the paths may be coincident. Additionally, in some implementations, the length of the reference path 151 or the test path 156 may be zero, and thus the one or more optical cavities 150 may be a single optical cavity (and accordingly, sometimes the one or more optical cavities 150 may be referred to simply as an optical cavity 150). The optical cavity 150 may have a variety of configurations e.g., as illustrated in FIGS. 1B and 1C, which may be used with a Michelson interferometer, a Twyman-Green interferometer, a Mach-Zehender interferometer, a Fizeau interferometer, etc.

The optical metrology device 100 includes a tunable light source 110 that produces a beam 116 that is directed to a polarization frequency shifting element 120. The tunable light source 110, for example, may be a collimated tunable laser source, or may include a broadband light source 112 and a wavelength control element 114, such as a tunable narrowband filter. The beam 116 produced by the tunable light source 110 has a time varying frequency $\omega(t)$, i.e., varying wavelength. The polarization frequency shifting element 120 receives the beam 116 and produces beams that are orthogonally polarized and have respective frequencies that differ by a first frequency shift $\Delta\omega_1$. For example, the polarization frequency shifting element 120 may produce an unshifted beam 122 with an unshifted frequency, i.e., has the same time varying frequency $\omega(t)$ as beam 116, and has a defined polarization state p1, and a frequency shifted beam 124 that is frequency shifted by $\Delta\omega_1$, and thus, has a time varying frequency of $\omega(t)-\Delta\omega_1$, and a defined polarization state p2 that is orthogonal with respect to the polarization state p1 of the unshifted beam 122. For example, the polarization state p1 of the unshifted beam 122 may be horizontal linear, while the polarization state p2 of the frequency shifted beam 124 may be vertical linear. The unshifted beam 122 and the frequency shifted beam 124 produced by the polarization frequency shifting element 120 may be substantially overlapped and collinear and may be represented as a combined beam 126, but the two beams 122 and 124 are illustrated separated in FIG. 1A for clarity.

A signal generator 130 is connected to the tunable light source 110 and produces a frequency drive signal 132 to control the generation of the time varying frequency $\omega(t)$ as beam 116 by the tunable light source 110. The signal generator 130 may be further connected to the polarization frequency shifting element 120 and produces a frequency shifting drive signal 134 to control the generation of the first frequency shift $\Delta\omega_1$. The frequency drive signal 132 produced by the signal generator 130, for example, may be a laser frequency drive signal or may be a monochromator control signal. If the tunable light source 110 is a tunable laser, the frequency drive signal 132 may be a laser frequency drive signal that is a linear ramp function, that may produce a laser frequency output that can be characterized by, $$\omega(t)_{laser}=\omega_0 \pm 2\pi\beta t \quad (1)$$

Where wo is a base optical frequency, $\beta$ is a so-called chirp coefficient and the polarity of the frequency shift is determined by the frequency drive signal. The frequency drive signal 132 may also include a non-linear component to correct for laser non-linearities. Other signal profiles for the frequency drive signal 132 may be used, but for the sake of reference only a linear time-dependent signal is described.

The frequency shifting drive signal 134 may be either a ramp function that maps to a moving mirror position in the polarization frequency shifting element 120 or a constant voltage that corresponds to a modulator frequency of, e.g., an acousto-optic modulator in the polarization frequency shifting element 120, a motor speed in the case of a rotating diffraction grating, or a piezo-electric transducer in the case of a fiber modulator. In any case the output of the polarization frequency shifting element 120 is characterized by a constant frequency shift between the unshifted beam 122 and shifted beam 124 equal to $\Delta\omega_1$. Other signal profiles for the frequency shifting drive signal 134 may be used to match alternate non-linear profiles for the frequency drive signal 132, but for clarity only a simple fixed frequency is presented herein.

The combined beam 126 is directed by a beam splitter 140 to the one or more optical cavities 150. By way of example, as illustrated, portions of the combined beam 125 is transmitted to a reference path 151 and another portion of the combined beam 125 is reflected to the test path 156. As illustrated in FIG. 1A, the reference path 151 and the test path 156 are recombined by a beam splitter 140a. In some implementations, a single beam splitter 140 may be used to split and recombine the beams. For example, in some implementations, one or more of the reference path 151 and the test path 156 may include reflective or partially reflective surfaces. It should be understood that in some implementations, the device under test may be held in the test path, with at least a portion of the light in the test path transmitted through the device under test, while in other implementations, the device under test may be at least partially reflective with at least a portion of the light in the test path reflected by the device under test. In some implementations, the interferometer may include a beam splitter that directs the combined beam 126 into separate optical cavities, e.g., a reference cavity that includes the reference path 151 and a test cavity that includes the test path 156, or into a single optical cavity that includes the test path 156, e.g., the beam splitter serves as a reference surface with a zero length reference path 151. The one or more optical cavities may be traversed by the light twice, e.g., in a Michelson, Twyman-Green or Fizeau configuration, or only once, e.g., in a Mach-Zehender configuration.

The optical cavity 150 has an optical path length L of the test path, which may be defined as the path difference between the reference path 151 and the test path 156. For example, where the combined beam 126 is separated into separate optical cavities, e.g., a reference cavity and the test cavity, the optical path length L is the difference between length of the reference path 151 and the length of the test path 156, one or both of which may be single pass or double pass (e.g., where a reflective surface is used). Assuming the light travels round trip through the optical cavity 150 it will experience a path delay time equal to 2L/c, where c is the speed of light. It should be understood that if the light traverses the optical cavity only once, e.g., in a Mach-Zehender configuration, the path delay time is due to a single pass through the optical cavity and may be written as L/c. Relative to the light traveling through the reference path 151 (which may have zero length), a beam that travels round trip through the test path 156 experiences a frequency shift that can be expressed by, $$\Delta\omega_2 = -\frac{2\pi\beta 2L}{c}. \tag{2}$$

A portion of each of the two beams in the combined beam 126 directed to the optical cavity 150, i.e., unshifted beam 122 and the frequency shifted beam 124, traverses the reference path 151 (which may have zero length) as a pair of reference beams 123 and 125, respectively, that differ from each other by the first frequency shift $\Delta\omega_1$. Portions of each of the two beams in the combined beam 126, i.e., unshifted beam 122 and the frequency shifted beam 124, traverses the test path 156 as a pair of test beams 153 and 155 respectively, that differ from each other by the first frequency shift $\Delta\omega_1$. The test path 156 induces a second relative frequency shift $\Delta\omega_2$ on the pair of test beams 153 and 155 with respect to the reference beams 123 and 125 owing to the test path time delay. The reference beams 123, 125 and/or the test beams 153 and 155 may traverse the reference path 151 and test path 156, respectively, e.g., via transmission through the reference path 151 and the test path 156, respectively, as illustrated in FIG. 1A, or via reflection from reflective or partially reflective components in the reference path 151 and the test path 156, respectively.

Thus, the unshifted beam 122 produces A) a first unshifted reference beam (reference beam 123) with a frequency $\omega(t)$ from the reference path 151, and B) a second unshifted delayed test beam (test beam 153) with a frequency $\omega(t)-\Delta\omega_2$ from the test path 156. The frequency shifted beam 124 produces C) a first frequency shifted reference beam (reference beam 125) with a frequency $\omega(t)-\Delta\omega_1$ from the reference path 151 and D) a second frequency shifted delayed test beam (test beam 155) from the test path 156 with a frequency $\omega(t)-\Delta\omega_1-\Delta\omega_2$.

FIG. 1B, by way of example, illustrates a portion of the optical metrology device 100 from FIG. 1A, like designated elements being the same, and a more detailed view of the one or more optical cavities 150, in a configuration with two separate double pass cavities, i.e., cavities with reflective or partially reflective surfaces. The one or more optical cavities 150 illustrated in FIG. 1B, by way of example, may have a Michelson, Twyman-Green or Mach-Zehender configurations.

As schematically illustrated in FIG. 1B, a beam splitter 160 may be present, that receives the combined beam 126 from beam splitter 140 and directs portions of the combined beam 126 into separate optical cavities, e.g., a reference cavity 162 that includes the reference path 151 with a reflective surface 151r and a test cavity 164 that includes the test path 156 with a reflective surface 156r, which may be the device under test or a reflective element with the device under test held within the test path 156. The reflective surface 151r in the reference path 151 may be sometimes referred to herein as a reference surface 151 and the reflective surface 156r in the test path 156 is sometimes referred to herein as the test surface 156r. The beam splitter 160, for example, may be a partially reflecting, non-polarizing glass plate or prism assembly. It should be understood that the reference cavity 162 and the test cavity 164 may be orthogonal to each other. The optical path length difference L, illustrated in FIG. 1B is the difference between length of the optical path to the reference surface 151r in the reference cavity 162 and the length of the optical path to the test surface 156r in the test cavity 164. It should be noted that if the refractive index in the reference cavity 162 differs from the test cavity 164, then the optical path length difference L will also be a function of the difference in the refractive index. Due to the reflective surfaces 151r and 156r present in the reference cavity 162 and the test cavity 164, the reference beams 123, 125 and the test beams 153 and 155 are received and recombined by the beam splitter 160 and directed to the beam splitter 140.

FIG. 1C, by way of example, illustrates a portion of the optical metrology device 100 from FIG. 1A, like designated elements being the same, and a more detailed view of the one or more optical cavities 150, in a configuration with a single cavity with a reflective surface. In the implementation illustrated in FIG. 1C, the reference path may be considered to have zero path length. The optical cavity 150 illustrated in FIG. 1C, by way of example, may have a Fizeau configuration.

As schematically illustrated in FIG. 1C, the reflective surface 151r may serve as the beam splitter 160 (shown in FIG. 1B) that receives the combined beam 126 from beam splitter 140, and also serves as a reference surface (and is sometimes referred to herein as reference surface 151r). The reference surface 151r is partially transparent so that a portion of each of the two beams in the combined beam 126, i.e., unshifted beam 122 and the frequency shifted beam 124, will reflect off the reference surface 151 to produce a pair of reference beams 123 and 125 respectively, and a portion of each of the two beams is transmitted through the reference surface 151 into the test cavity 166, as illustrated by beam 152 and 154 respectively. The beams 152 and 154 reflect off a reflective test surface 156r and are returned from the test cavity, e.g. reflected off the test surface 156 and transmitted through reference surface 151 to produce a pair of test beams 153 and 155 respectively. In the configuration illustrated in FIG. 1C, the reference path and the test path are on a common optical axis. Additionally or alternatively, the reference path may be considered to have zero length, so that there is only a test cavity 166 with an optical path length L between the reference surface 151 and the test surface 156.

Regardless of the optical cavity configuration, the electric field of each of the four beams 123 (A), 125 (B), 153 (C), and 155 (D), may be expressed as:

$$A = R\hat{p}_1 e^{-i\omega(t)t} \tag{3}$$

$$B = T\hat{p}_1 e^{-i(\omega(t)-\Delta\omega_2)t} \tag{4}$$

$$C = R\hat{p}_2 e^{-i(\omega(t)-\Delta\omega_1)t} \tag{5}$$

$$D = T\hat{p}_2 e^{-i(\omega(t)-\Delta\omega_1-\omega_2)t}. \tag{6}$$

Where R and T represent the reflectivity and spatially dependent phase delay of the reference path 151 and the test path 156, respectively, and $\hat{p}_1$ and $\hat{p}_2$ represent the polarization states.

The four response beams 123, 125, 153, and 155 may be substantially overlapped and collinear and may be represented as a combined response beam 158, but the four beams 123, 125, 153, and 155 are illustrated separated in FIGS. 1A, 1B, and 1C for clarity. The response beams 123, 125, 153, and 155 are directed (e.g., by beam splitter 140a in FIG. 1A, and by the beam splitter 140 in FIGS. 1B and 1C) to a polarization phase sensor 170 that contains one or more polarizers that creates interference fringe patterns from the orthogonally polarized beams and a camera that operates with frame integration time δt to spatially measure the intensity pattern.

The optical metrology device 100 is tuned so that the first frequency shift $\Delta\omega_1$ produced by the polarization frequency shifting element 120 has a pre-defined relationship to the second frequency shift $\Delta\omega_2$ produced by the optical path delay of the test path 156 over the sensor integration time. The pre-defined relationship, for example, may be a match between the frequency shift magnitudes. The frequency shift magnitudes, for example, may closely match, e.g., with zero or little difference between frequency shifts, or may match within a predetermined amount, e.g., with an offset, but should not substantially change over the integration time of the sensor. The pre-defined relationship may be based on the frequencies themselves or may be based on the resulting interference fringes in the resulting interferogram. For example, the pre-defined relationship may be based on the relationship between frequency shifts that is sufficient to produce a desired contrast in the resulting interference fringes in an interferogram over the integration time of the sensor, which may be measured and fed back to the polarization frequency-shifting element 120, via the ramp generator 130. For example, a desired contrast may be, e.g., 5% or greater. For the sake of example, the pre-defined relationship may be a close match between the first frequency shift $\Delta\omega_1$ and the second frequency shift $\Delta\omega_2$, which may be written as, $$\Delta\omega_1 = \Delta\omega_2 = -\frac{2\pi\beta 2L}{c}. \tag{7}$$

It should be understood that the match between the first frequency shift $\Delta\omega_1$ and the second frequency shift $\Delta\omega_2$ need not be exact. For example, over the integration time of the sensor, the first frequency shift $\Delta\omega_1$ and the second frequency shift $\Delta\omega_2$ may vary and thus, the match between the first frequency shift $\Delta\omega_1$ and the second frequency shift $\Delta\omega_2$ may likewise vary. For example, a match between the first frequency shift $\Delta\omega_1$ and the second frequency shift $\Delta\omega_2$ that is within approximately a kilohertz during the integration time of the sensor may be adequate and may even be desirable as a means to keep the signals locked or reject stray light. The precision of the match between the first frequency shift $\Delta\omega_1$ and the second frequency shift $\Delta\omega_2$ may depend on various factors including, e.g., the integration time of the sensor.

With the first frequency shift $\Delta\omega_1$ having the pre-defined relationship to the second frequency shift $\Delta\omega_2$ over the sensor integration time, the electrical field from the second unshifted delayed reflected beam (test beam 153) and the first frequency shifted reflected beam (reference beam 125), i.e., B and C in equations 4 and 5, will produce a stable interference pattern in the polarization phase sensor 170 because the test beam 153 and the reference beam 125 are orthogonally polarized and have frequency shift magnitudes with the pre-defined relationship. Accordingly, the polarization phase sensor 170 will measure the relative phase difference between the reference beam 125 and the test beam 153 produced by the reference path 151 and the test path 156, respectively. The other beam combinations, e.g., between beams 123/153, 123/125, 123/155, 153/155, 125/155, will produce a rapidly time varying signal that will average to a fixed background signal. To ensure that the other beam combinations average to a constant value the following condition may be enforced, $$\delta t = N \frac{c}{2\beta L}, \tag{8}$$

where N is an integer and δt is the integration time of the camera in the polarization phase sensor 170. The fringes produced by the interference between the other beam combinations, i.e., between all the beams except for the reference beam 125 and the test beam 153, will oscillate through an integer number of cycles during the camera integration time δt and produce zero contrast. That is, the detected contrast of the interference fringes produced by all the beams will be zero, except for the pattern produced between the two desired beams, reference beam 125 and test beam 153. The optical metrology device 100 may also include imaging optics as desired to relay an image of the object under test back to the sensor plane.

The contrast or fringe visibility of the fringe patterns may be calculated by, $$V = \left| \frac{\sin\Delta\phi}{\Delta\phi} \right|, \tag{9}$$

where $\Delta\phi = \omega \cdot \delta t$ is the time integrated phase change and δt is the camera integration time. In the case of the unwanted fringe patterns, $\Delta\phi = \Delta\omega_1 \cdot \delta t$. By adjusting either the frequency shift $\Delta\omega_1$ or the camera integration period, the function can be tuned to a minimum by fulfilling equation 8. For large values of time integrated phase, the sensitivity to tuning is significantly reduced. For example, with a frequency shift of 2π 26 kHz and a camera integration time of 0.5 millisecond, the time integrated phase becomes 80 radians and the fringe contrast is less than one percent even if the time integrated phase is not tuned exactly to an integer value of 2π. Accordingly, in practice, exact tuning of the frequency shift $\Delta\omega_1$ or camera integration period is not necessary for good operation. In practice, for example, it may be sufficient to meet the condition of $$\delta t \geq 13 \frac{c}{2\beta L}. \tag{10}$$

Commercial tunable lasers that may be used for tunable light source 110, for example, may have a chirp coefficient ~4000 GHz per second. Thus, for an optical pathlength L=1 meter in an optical cavity 150, equation 10 requires a camera integration time equal to or greater than 500 microseconds. This integration time is sufficiently short to freeze any disturbances in the cavity due to vibration and air currents.

Due to the ability of the polarization phase sensor 170 to capture three or more interferograms simultaneously, any relative motion of the optical cavity 150 due to vibration only decreases the measured fringe contrast and does not introduce a significant phase-shift error in the measurement. Vibration amplitudes of λ/4 can be tolerated during the sub-millisecond integration time, where λ is the nominal wavelength of the beam 116 produced by the tunable light source 110. Therefore, a large amount of relative motion can be tolerated during the integration time of the camera. In comparison, with a standard temporal phase-shift interferometer, the typical acquisition time is 120 ms over which the integrated phase due to relative vibration motion must not exceed $\sim\lambda/20$ in order to keep the relative phase-shift error between frames small. The optical metrology device 100, thus, provides a 1200 times improvement in vibration tolerance over standard techniques. Higher frequency shifts and shorter camera integration times may further increase the vibration tolerance. Thus, it is possible to achieve single shot, vibration immune dynamic performance, on-axis, with a long coherence laser source, without translation of the optical cavity.

Figure 2:
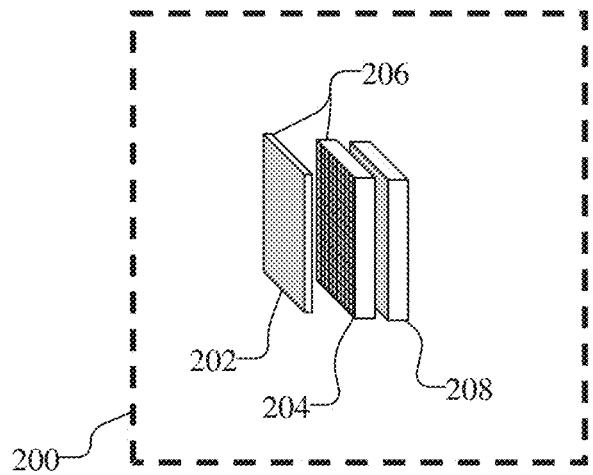
FIG. 2 illustrates an implementation of a polarization phase sensor using a pixelated phase mask.

FIG. 2 shows an embodiment of a polarization phase sensor 200 that uses a pixelated phase-mask, and which may be used as the polarization phase sensor 170 shown in FIG. 1A. The polarization phase sensor 200 may include an optional quarter-wave plate 202 to convert linear polarization to circular polarization, a pixelated phase-mask 204, which may be combined together with the quarter-wave plate 202 to make a combined phase-mask 206, and a camera sensor 208 such as a CCD or CMOS array. (As used herein, "polarization phase sensor" is intended to cover any detector suitable for sensing and measuring the signal received from the optical device, whether consisting of a single or multiple components, such as sensors consisting of multiple adjacent sensor elements.) The combined phase-mask 206 may be registered with respect to and may be bonded to the camera sensor 208.

Figure 3:
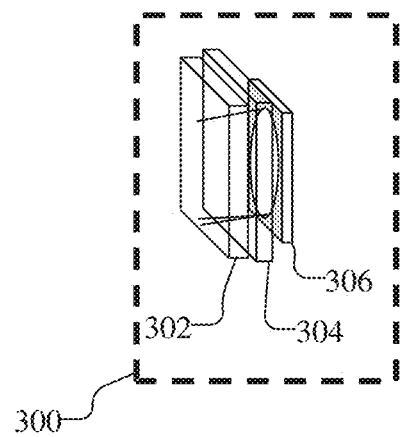
FIG. 3 illustrates an implementation of a polarization phase sensor using a spatial carrier sensor.

FIG. 3 shows another embodiment of a polarization phase sensor 300 that uses a spatial carrier sensor, and which may be used as the polarization phase sensor 170 shown in FIG. 1A. The polarization phase sensor 300 may include a Wollaston prism 302 to separate the two orthogonal polarizations by a small angle, a polarizer 304 to interfere the two beams and produce a high-frequency spatial carrier fringe pattern, and a camera sensor 306 such as a CCD or CMOS array to detect the interference pattern. Many other embodiments for spatial and parallel polarization phase-sensors are also possible.

Figure 4:
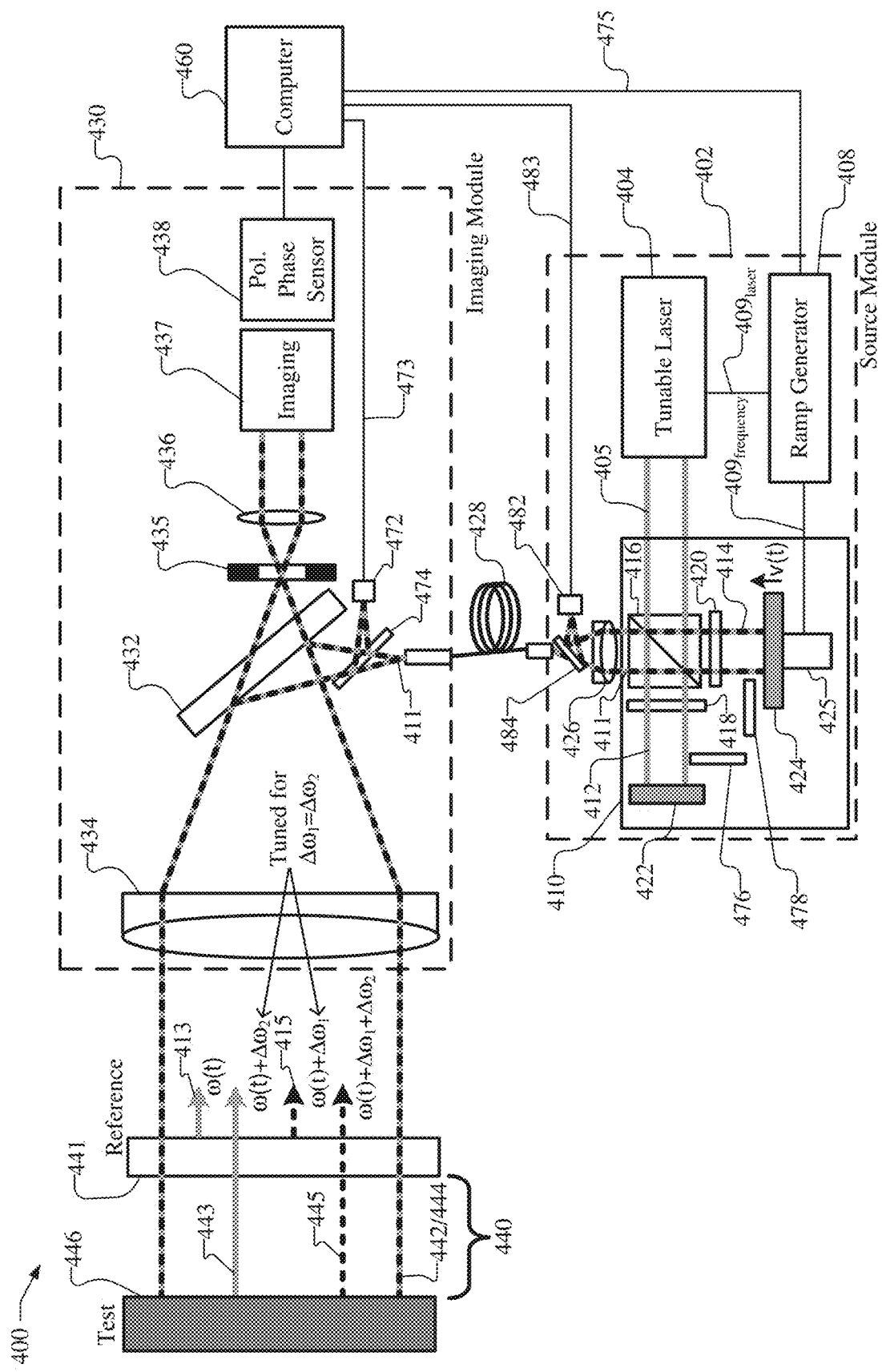
FIG. 4 shows a schematic representation of an optical device with a Fizeau interferometer measurement system.

FIG. 4 shows a schematic representation of an optical metrology device 400 configured for characterizing a test object using phase-shift interferometry with a Fizeau interferometer as discussed herein. The optical metrology device 400 may be one example implementation of optical metrology device 100.

Optical metrology device 400 includes a source module 402, which includes a tunable light source, e.g., in the form of a tunable laser 404, a polarization frequency shifting element 410, and a ramp generator 408. The tunable laser 404 produces a beam 405 with a time varying frequency $\omega(t)$, illustrated with solid grey lines, which is directed to the polarization frequency shifting element 410. The polarization frequency shifting element 410 produces an unshifted beam 412 having a defined polarization state and a frequency shifted beam 414 having a frequency shift of $\Delta\omega_1$ and polarization state that is orthogonal with respect to the polarization state of the unshifted beam 412. The unshifted beam 412 has the time varying frequency $\omega(t)$ and is likewise illustrated with solid grey lines, while the frequency shifted beam 414 includes the frequency shift of $\Delta\omega_1$ and thus has a total frequency shift of $\omega(t)-\Delta\omega_1$ and is illustrated with a dotted black lines. The unshifted beam 412 and the frequency shifted beam 414 are combined into a combined beam 411 which is illustrated as a combined solid grey lines and dotted black lines.

In the embodiment illustrated in FIG. 4, the polarization frequency shifting element 410 includes a polarization beam splitter 416 that first divides the beam 405 into beams 412 and 414 with horizontal and vertical linear polarizations, respectively. Quarter waveplates 418 and 420 convert the beams 412 and 414 into circular polarizations, respectively. The unshifted beam 412 reflects from stationary mirror 422, obtaining the opposite circular polarization on reflection, then transmits back through quarter-wave plate 418, whereupon it exits with vertical polarization and is subsequently reflected by beam splitter 416 and focused with lens 426 into polarization maintaining fiber 428. Beam 414 reflects from a moving mirror 424, obtaining the opposite circular polarization on reflection and frequency shift $\Delta\omega_1$, then transmits back through quarter-wave plate 420, whereupon it exits with horizontal polarization and is subsequently transmitted through beam splitter 416, combines with unshifted beam 412 into combined beam 411, and is focused with lens 426 into polarization maintaining fiber 428.

In one implementation, the moving mirror 424 and stationary mirror 422 utilize corner cubes or cats-eye reflectors, which make the overlap and co-linearity of the combined beam 411 insensitive to small fluctuations of the input beam or tilt of the mirrors.

The combined beam 411 exit the polarization preserving fiber 428 and is received by an imaging module 430. As illustrated, the combined beam 411 is incident on beam splitter 432 and is directed (reflected as illustrated in FIG. 4) to collimation lens 434 and the collimated beam is received by a Fizeau optical cavity 440. The Fizeau optical cavity 440 includes a partially reflective surface 441, sometimes referred to as the reference surface 441, and a second reflective surface 446, sometimes referred to as the test surface 446. The test surface 446 may be a reflective surface of the device under test or may be a component of the Fizeau optical cavity, e.g., where a transmissive device under test is held between the reference mirror 441 and the test mirror 446. The Fizeau optical cavity 440 has an optical pathlength L between the reference mirror 441 and the test mirror 446. Beams traveling round trip though the Fizeau optical cavity 440 experience a path delay time equal to 2L/c, where c is the speed of light. Therefore, relative to the beams 412 and 414 in the combined beam 411 impinging on the reference mirror 441, the portions of the beams 412 and 414 that are transmitted through the reference mirror 441, i.e., labeled beams 442 and 444, respectively, travel round trip through the Fizeau optical cavity 440 and experience a frequency shift of $\Delta\omega_2$ that can be expressed by equation 2.

As illustrated in FIG. 4, the unshifted beam 412 produces a first unshifted reflected beam 413 from reference mirror 441 with a frequency of $\omega(t)$, and a second unshifted delayed reflected beam 443 from the test mirror 446 with a total frequency of $\omega(t)+\Delta\omega_2$. The frequency shifted beam 414 produces a first frequency shifted reflected beam 415 from the reference mirror 441 with a frequency of $\omega(t)-\Delta\omega_1$, and a second frequency shifted delayed reflected beam 445 from the test mirror 446 with a frequency of $\omega(t)-\Delta\omega_1-\Delta\omega_2$. The electric field of each of the four beams 413, 443, 415, and 445 can be expressed as in equations 3-6. If the system is tuned such that $\Delta\omega_1=\Delta\omega_2$ then the electrical field from unshifted delayed reflected beam 443 and frequency shifted reflected beam 415 will have the same optical frequency and can produce a stable interference pattern. The reflected beams 413, 443, 415, and 445 are focused by collimation lens 434, and are directed by (e.g., transmitted through) beam splitter 432 towards imaging optics. For example, the focused beams may be filtered by aperture 435 and received by the imaging lens 436, which forms an image of the test mirror 446. An optional imaging relay system 437 may provide selectable magnification using, for example, a zoom lens assembly. The image is formed or relayed to polarization phase sensor 438 that may allow quantitative measurement of relative phase in a single camera integration time. Electronic signals from the polarization phase sensor 438 are sent to a computer 460 analysis and display.

The ramp generator 408 in the source module 402 produces electrical signals for laser drive signal $409_{laser}$ and frequency drive signal $409_{frequency}$ that control the tunable laser source 404 and polarization frequency shifting device 410, respectively. The laser drive signal $409_{laser}$ may be a linearly increasing ramp function and may produce a laser frequency output equal to $\omega(t)_{laser}$ and in Equation 1. In the embodiment of FIG. 4, the frequency drive signal $409_{frequency}$ may be a linear ramp that corresponds to the position of the moving mirror 424 and drives a transducer 425 coupled to the moving mirror 424, which may be a piezo-electric element or voice coil. The frequency shifted beam 414 reflected from the moving mirror 424 is shifted by a frequency $\Delta\omega_1$ due to the velocity v(t) of the moving mirror 424 according to the Doppler shift, $$\Delta\omega_1 = \pm \frac{4\pi v_1}{\lambda}, \tag{11}$$

where $v_1$ is the velocity of the moving mirror 424 and the sign is determined by the direction of travel. For the previous example of Fizeau optical cavity with a one-meter length L and $\beta$=4000 Ghz per second, the frequency shift $\Delta\omega_1=2\pi*26$ kHz, and $v_1$=8 mm/second, and a wavelength of 633 nm. This mirror velocity is attainable with commercial piezo-electric transducers over the required integration time of a few milliseconds.

The frequency shift $\Delta\omega_1$ produced by the polarization frequency shift element 410 can be either positive or negative by, for example, changing the direction of the moving mirror 424 relative to the time varying frequency shift. With the first frequency shift $\Delta\omega_1$ matching in magnitude but opposite being opposite in direction to the second frequency shift $\Delta\omega_2$, e.g. $\Delta\omega_1=-\Delta\omega_2$, the electrical field from the first unshifted reflected beam (test beam 123) and the second frequency shifted delayed reflected beam (reference beam 155), i.e., A and D in equations 4 and 5, will produce a stable interference pattern in the polarization phase sensor 170. In this case the test beam 123 and the reference beam 155 are orthogonally polarized but the polarization orientation is reversed from the case of $\Delta\omega_1=\Delta\omega_2$. Subtracting the two measurements made with different polarity and dividing by two will produce a measurement result where the effects of any residual birefringence in the interferometer are cancelled. Adding the two measurements with different polarity will cancel the cavity contribution and directly measure only the birefringence in the system.

FIGS. 1B, and 1C illustrate a test path with only a single return surface; however, it is possible to have a test path with multiple return surfaces such as a thick window or a stack of windows (multiple cavities). In this case each surface will produce two additional beams each having additional frequency shift owing to the additional optical path. The first frequency $\Delta\omega_1$ may be adjusted to match any of the additional delays, thus isolating any particular cavity of interest.

An optional mechanism for rapidly adjusting either the laser drive or the fixed frequency drive from the ramp generator 408 is the use of a photodiode 472 used in combination with an additional beam splitter 474 and placed at a focus of the returned beams in the imaging module 430. By blocking one of the beams 412 or 414 inside the polarization frequency shifting device 410 with a shutter 476 or second shutter 478, the photodiode 472 will directly measure the frequency due to the cavity roundtrip delay, $\Delta\omega_2$. The photodiode signal 473 may be measured by the computer 460 and used to send a feedback signal 475 to the ramp generator 408 to control the laser drive signal $409_{laser}$ and/or the frequency drive signal $409_{frequency}$. This signal may also be used to calculate the absolute cavity distance, provided the index of refraction is known, and vice versa.

Similarly, the frequency shift $\Delta\omega_1$ produced by the polarization frequency shift element 410 can be directly measured on photodiode 472 by blocking the beams reflected by the test surface, e.g., using a beam dump in the Fizeau optical cavity 440 (not shown), so that only first reflected beam 413 and third reflected beam 415 are present on the photodiode 472. The photodiode signal 473 may be measured by the computer 460 and used to send a feedback signal 475 to the ramp generator 408 to control the laser drive signal $409_{laser}$ and/or the frequency drive signal $409_{frequency}$.

Optionally, a second photodiode 482 may be placed within the source module 402 by means of a partially reflecting beam splitter 484 to continuously measure the frequency shift $\Delta\omega_1$. The frequency shift signal 483 may be monitored by the computer 460 and used to send a feedback signal 475 to the ramp generator 408 to control the laser drive signal $409_{laser}$ and/or the frequency drive signal $409_{frequency}$. Thus, both $\Delta\omega_1$ and $\Delta\omega_2$ can be monitored and adjusted as necessary to optimize for different test conditions, such as changes in the Fizeau optical cavity length.

Figure 5:
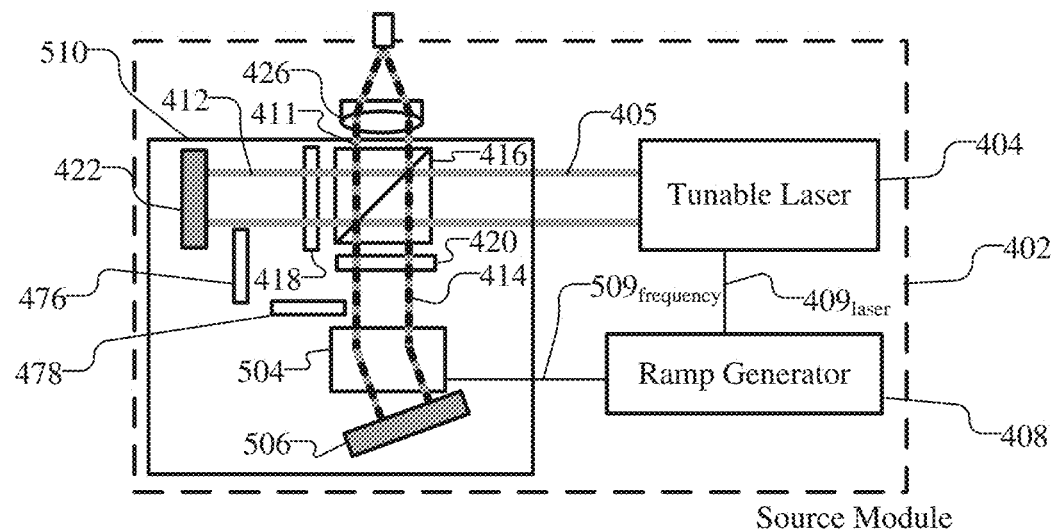
FIG. 5 illustrates an implementation of the polarization phase-shifting device using an acousto-optic modulator.

FIG. 5 shows the source module 402 with another embodiment of a polarization frequency shifting element 510. Polarization frequency shifting element 510 may be similar to and used in place of polarization frequency shifting element 410, illustrated in FIG. 4. Some designated elements in polarization frequency shifting element 510 appear in FIG. 4, where a same designation indicates the element functions as previous described. A tunable laser source 404 produces a beam 405 that is directed to a polarization beam splitter 416 that divides the beam 405 into beams 412 and 414 with horizontal and vertical linear polarizations, respectively. Quarter waveplates 418 and 420 convert the beams 412 and 414 into circular polarizations, respectively. Unshifted beam 412 reflects from stationary mirror 422, obtaining the opposite circular polarization on reflection, then transmits back through quarter-wave plate 418, whereupon it exits with vertical polarization and is subsequently reflected by beam splitter 416 where it forms part of the combined beam 411. Beam 414 is diffracted from an acousto-optic modulator (AOM) 504, such as a model ADM-40 Acousto-Optic Deflector-Modulator by IntraAction Corp., that, by means of the drive signal $509_{frequency}$ from the ramp generator 408, introduces a frequency shift $\Delta\omega_1/2$. Beam 414 is subsequently reflected from static mirror 506, obtaining the opposite circular polarization on reflection and subsequently travels back through acoustic-optic modulator 504 where it is diffracted a second time and obtains an additional frequency shift $\Delta\omega_1/2$ such that the total frequency shift of beam 414 is $\Delta\omega_1$. Beam 414 then transmits back through quarter-wave plate 420, whereupon it exits with horizontal polarization and is subsequently transmitted through beam splitter 416, and combines with unshifted beam 412 to form combined beam 411.

Figure 6:
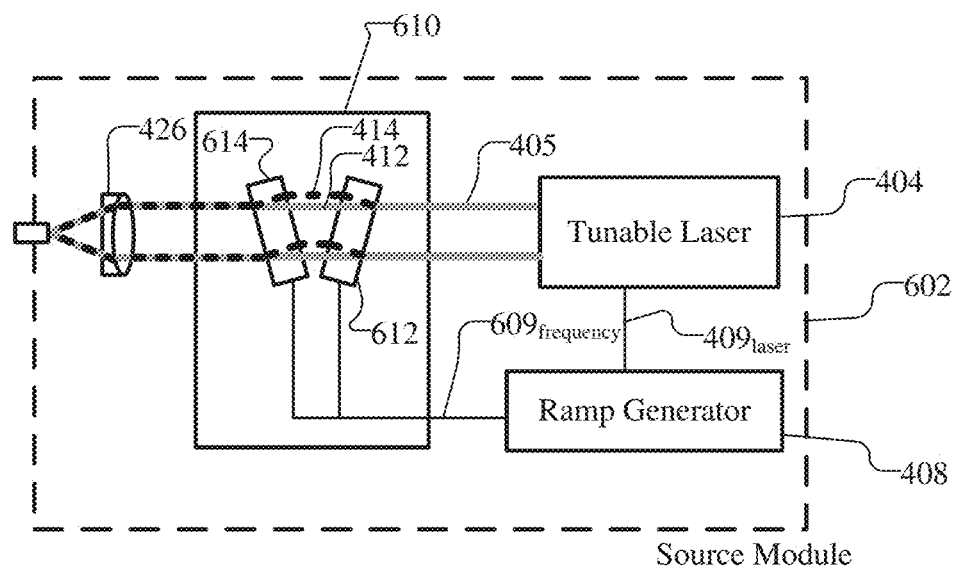
FIG. 6 illustrates an implementation of the polarization phase-shifting device using two acousto-optic modulators.

FIG. 6 shows the source module 402 with another embodiment of a polarization frequency shifting element 610. Polarization frequency shifting element 610 may be similar to and used in place of polarization frequency shifting element 402, illustrated in FIG. 4. Some designated elements in polarization frequency shifting element 610 appear in FIG. 4, where a same designation indicates the element functions as previous described. A tunable laser source 404 produces a beam 405 that is directed to the polarization frequency shifting element 610 that includes a polarization acousto-optic modulator 612, such as a model ATM-A1/A2 Series Acousto-Optic Frequency Shifter by IntraAction Corp., that divides the beam 405 into beams 412 and 414 with horizontal and vertical linear polarizations, respectively. Additionally, polarization acousto-optic modulator 612 adds a frequency shift of $\omega_\alpha + \Delta\omega_1$ to beam 414. Beams 412 and 414 are then incident on a second polarization acousto-optic modulator 614 that is oriented correctly to diffract beam 414, causing it to be colinear with beam 412, and impart a frequency shift of $-\omega_\alpha$ on beam 414. Beam 414 has a total frequency shift of $\Delta\omega_1$ and combines with unshifted beam 412 to form combined beam 411.

In the embodiments presented, the source module 402 (502 and 602) is shown as separate from the imaging module 430; however, it is noted that both modules may be combined in a single unit either with or without polarization fiber-optic cable 428 if desired.

As illustrated, the polarization phase sensor 438, as well as other components of the optical metrology device 400, such as the photodiodes 472, 482, and ramp generator 408 may be coupled to the computer 460. The computer 460 may be a workstation, a personal computer, central processing unit or other adequate computer system, or multiple systems. It should be understood that the computer 460 includes one or more processing units that may be separate or linked processors, and computer 460 may be referred to herein sometimes as a processor, at least one processor, one or more processors, etc. The computer 460 is preferably included in, or is connected to, or otherwise associated with optical metrology device 400. The computer 460, for example, may control the ramp generator 408 to control the tunable light source, e.g., tunable laser 404 shown in FIG. 4, and control the polarization frequency shifting element 410 to set $\Delta\omega_1 = \Delta\omega_2$ as described herein. The computer 460 may also collect and analyze the data obtained from the polarization phase sensor 438. The computer 460 may analyze the data to determine one or more physical characteristics of the sample under test. In some implementations, the measured data may be obtained and compared to a modeled data, which may be stored in a library or obtained in real time. Parameters of the model may be varied, and modeled data compared to the measured data, e.g., in a linear regression process, until a good fit is achieved between the modeled data and the measured data, at which time the modeled parameters are determined to be the characteristics of the sample.

The computer 460 may include at least one processing unit, memory, as well as a user interface including e.g., a display and input devices. A non-transitory computer-usable storage medium having computer-readable program code embodied may be used by the computer 460 to control the optical metrology device 400 and to perform the measurement functions and analysis described herein. The data structures and software code for automatically implementing one or more acts described in this detailed description can be implemented by one of ordinary skill in the art in light of the present disclosure and stored, e.g., on a computer-usable storage medium, which may be any device or medium that can store code and/or data for use by a computer system. The computer-usable storage medium may be, but is not limited to, flash drive, magnetic and optical storage devices such as disk drives, magnetic tape, compact discs, and DVDs (digital versatile discs or digital video discs). A communication port may also be used to receive instructions that may be stored on memory and used to program the computer to perform any one or more of the functions described herein and may represent any type of communication connection, such as to the internet or any other computer network. The communication port may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. The results from the analysis of the data may be stored, e.g., in memory, associated with the sample and/or provided to a user, e.g., via display, an alarm, data set, or other output device. Moreover, the results from the analysis may be fed back to the process equipment to adjust the appropriate step to compensate for any detected variances in the processing.

Figure 7:
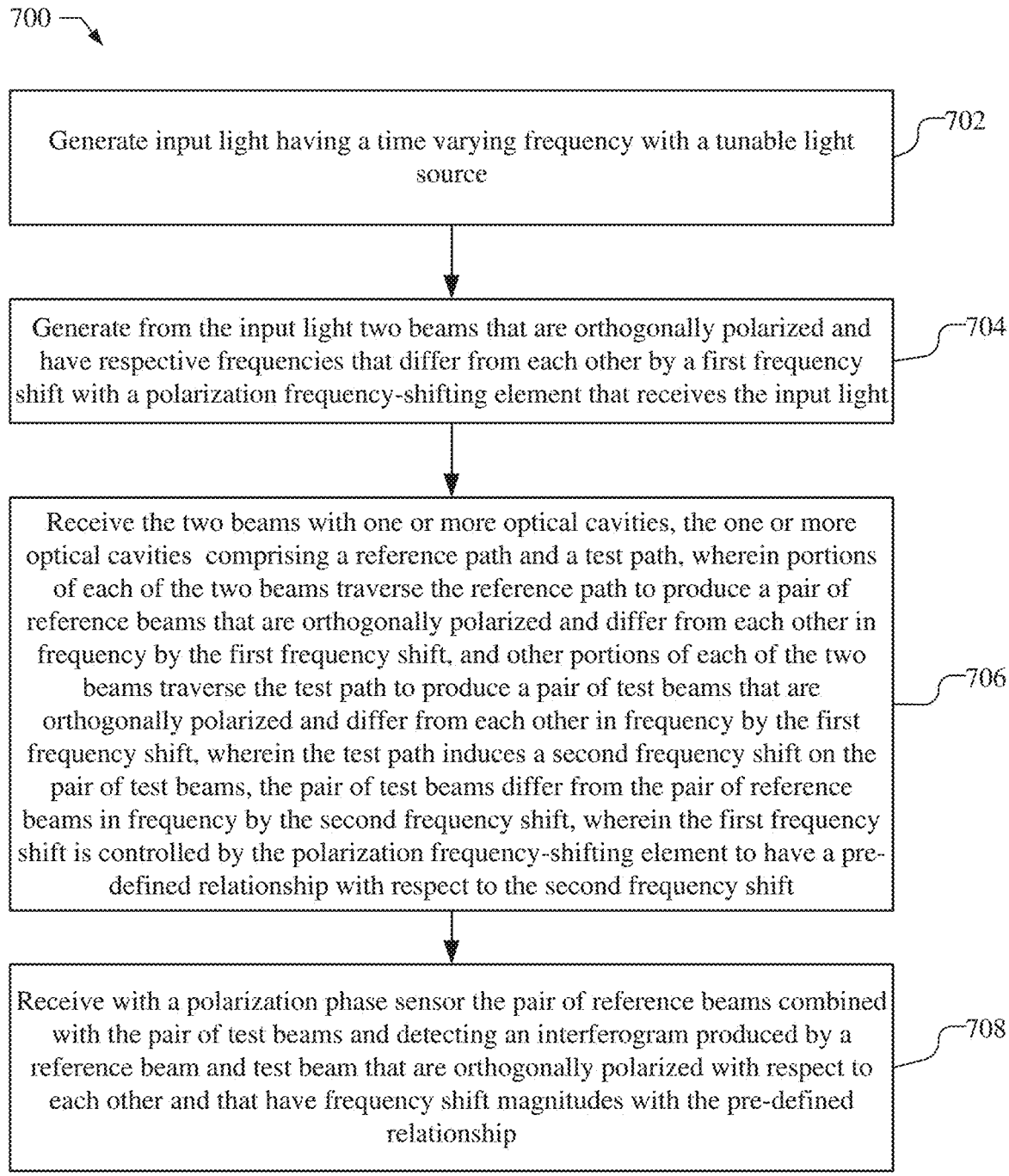
FIG. 7 is a flow chart illustrating a method of operation of an optical metrology device for characterizing a test object.

FIG. 7 is a flow chart 700 illustrating a method of characterizing a test object with an optical device, such optical metrology device 100 or 400 with as optical cavity 150 illustrated in FIG. 1A (and further illustrated in FIGS. 1B and 1C) or the Fizeau optical cavity 440 illustrated in FIG. 4, as described herein.

As illustrated by block 702, the optical metrology device generates input light having a time varying frequency. In some implementations, the tunable light source may be one of a tunable laser, such tunable laser 404 illustrated FIG. 4, or a broadband light source and tunable narrowband filter, such as light source 112 and wavelength control element 114 shown in FIG. 1A. Thus, a means for generating input light having a time varying frequency may be the tunable light source 110 illustrated in FIG. 1A or the tunable laser 404 illustrated in FIG. 4. The means for generating input light having a time varying frequency may further include the ramp generator 130 illustrated in FIG. 1A or the ramp generator 408 illustrated in FIG. 4.

At block 704, from the input light the optical metrology device generates two beams that are orthogonally polarized and have respective frequencies that differ from each other by a first frequency shift, such as beams 122 and 124 illustrated in FIG. 1A or beams 412 and 414 illustrated in FIG. 4. For example, a means for generating from the input light two beams that are orthogonally polarized and have respective frequencies that differ from each other by a first frequency shift may be the polarization frequency-shifting element 120 illustrated in FIG. 1A, the polarization frequency-shifting element 410 illustrated in FIG. 4, or the polarization frequency-shifting elements 510 or 610 illustrated in FIGS. 5 and 6, respectively. The means for generating from the input light two beams that are orthogonally polarized and have respective frequencies that differ from each other by a first frequency shift may further include the ramp generator 130 illustrated in FIG. 1A or the ramp generator 408 illustrated in FIG. 4.

At block 706, the optical metrology device receives the two beams with one or more optical cavities comprising a reference path and a test path, wherein portions of each of the two beams traverse the reference path to produce a pair of reference beams that are orthogonally polarized and differ from each other in frequency by the first frequency shift, and other portions of each of the two beams traverse the test path to produce a pair of test beams that are orthogonally polarized and differ from each other in frequency by the first frequency shift, wherein the test path induces a second frequency shift on the pair of test beams, the pair of test beams differ from the pair of reference beams in frequency by the second frequency shift, wherein the first frequency shift is controlled by the polarization frequency-shifting element to have a pre-defined relationship with respect to the second frequency shift, e.g., as discussed in reference to FIGS. 1A and 4. A means for receiving the two beams with the one or more optical cavities, the one or more optical cavities comprising a reference path and a test path, wherein portions of each of the two beams traverse the reference path to produce a pair of reference beams that are orthogonally polarized and differ from each other in frequency by the first frequency shift, and other portions of each of the two beams traverse the test path to produce a pair of test beams that are orthogonally polarized and differ from each other in frequency by the first frequency shift, wherein the test path induces a second frequency shift on the pair of test beams, the pair of test beams differ from the pair of reference beams in frequency by the second frequency shift, wherein the first frequency shift is controlled by the polarization frequency-shifting element to have a pre-defined relationship with respect to the second frequency shift match over a sensor integration time may include the one or more optical cavities 150 illustrated in FIGS. 1A, 1B, and 1C or the Fizeau one or more optical cavities 440 illustrated in FIG. 1A. The means for receiving the two beams with one or more optical cavities may further include the beam splitter 140 illustrated in FIG. 1A, beam splitter 160 shown in FIG. 1B, the reference surface 151$r$ shown in FIG. 1C, or one or more of the polarization fiber-optic cable 428, and one or more components of the imaging module 430, including the beam splitter 432 and lens 434 or any combination thereof as shown in FIG. 4.

At block 708, the pair of reference beams combined with the pair of test beams are received and an interferogram produced by a reference beam and test beam that are orthogonally polarized with respect to each other and that have frequency shift magnitudes with the pre-defined relationship is detected. The pre-defined relationship may be precisely or approximately matching frequency shift magnitudes that is sufficient to produce an interference fringe contrast in the interferogram over an integration time of the polarization phase sensor that has a desired contrast, e.g., at least 5%. In some implementations, the first frequency shift may match the second frequency shift in magnitude and may have the same or opposite direction as the second frequency shift. For example, a means for receiving the pair of reference beams combined with the pair of test beams and detecting an interferogram produced by a reference beam and test beam that are orthogonally polarized with respect to each other and that have frequency shift magnitudes with the pre-defined relationship may be the polarization phase sensor 170 illustrated in FIG. 1A or the polarization phase sensor 438 illustrated in FIG. 4, or polarization phase sensors 200 or 300 shown in FIGS. 2 and 3, respectively. The means for receiving the pair of reference beams combined with the pair of test beams and detecting an interferogram produced by a reference beam and test beam that are orthogonally polarized with respect to each other and that have frequency shift magnitudes with the pre-defined relationship may further include the beam splitter 140 illustrated in FIG. 1A or one or more of components of the imaging module 430, including the lens 434, beam splitter 432, aperture 435, imaging lens 436, imaging relay system 437 or any combination thereof as shown in FIG. 4.

In some implementations, the one or more optical cavities may be a Fizeau optical cavity, wherein the reference path and the test path are on a common optical axis. In some implementations, the optical metrology device may further direct the two beams towards the Fizeau optical cavity and receive and combine the pair of reference beams and the pair of test beams and direct the combined pair of reference beams and the pair of test beams to the polarization phase sensor. For example, a means for directing the two beams towards the Fizeau optical cavity and receiving and combining the pair of reference beams and the pair of test beams and directing the combined pair of reference beams and the pair of test beams to the polarization phase sensor may be the beam splitter 140 illustrated in FIG. 1A or beam splitter 432 illustrated in FIG. 4. In some implementations, the one or more optical cavities may be for one of a Michelson interferometer, a Twyman-Green interferometer, or a Mach-Zehender interferometer.

In some implementations, the second frequency shift induced on the pair of test beams is a function of a length of the one or more optical cavities, and wherein the pre-defined relationship is a match between the first frequency shift and the second frequency shift that produces an interference fringe contrast in the interferogram that is at least 5% over an integration time of the polarization phase sensor. For example, a means for controlling the first frequency shift to have a pre-defined relationship with the second frequency shift to produce an interference fringe contrast in the interferogram that is at least 5% over an integration time of the polarization phase sensor may be the polarization frequency-shifting element 120 illustrated in FIG. 1A, the polarization frequency-shifting element 410 illustrated in FIG. 4, or the polarization frequency-shifting elements 510 or 610 illustrated in FIGS. 5 and 6, respectively. The means for controlling the first frequency shift to have a pre-defined relationship with the second frequency shift to produce an interference fringe contrast in the interferogram that is at least 5% over an integration time of the polarization phase sensor may further include the ramp generator 130 illustrated in FIG. 1A or the ramp generator 408 illustrated in FIG. 4. In some implementations, the one or more optical cavities may include a plurality of return surfaces, where each return surface produces different second frequency shifts, the method may further include controlling the first frequency shift to have the pre-defined relationship with the second frequency shift associated with a selected return surface.

In some implementations, the pair of reference beams comprises a first reference beam having the time varying frequency and a second reference beam having the time varying frequency and the first frequency shift, and the pair of test beams comprises a first test beam having the time varying frequency and the second frequency shift, and a second test beam having the time varying frequency and the first frequency shift and the second frequency shift. The optical metrology device may detect the interferogram by detecting the interferogram produced by interference of the second reference beam and the first test beam with a polarization phase sensor, e.g., as discussed in relation to beams 153 and 125 of FIG. 1A or beams 443 and 415 of FIG. 4.

In some implementations, the optical metrology device may control the tunable light source with a first drive signal and control the polarization frequency-shifting element with a second drive signal to generate the first frequency shift with the pre-defined relationship with respect to the second frequency shift. A means for controlling the tunable light source with a first drive signal and controlling the polarization frequency-shifting element with a second drive signal to generate the first frequency shift with the pre-defined relationship with respect to the second frequency shift may be the ramp generator 130 and signals 132 and 134, respectively, illustrated in FIG. 1A or the ramp generator 408 and signals 409$_{laser}$ and 409$_{frequency}$, respectively, illustrated in FIG. 4, or signals 409$_{laser}$ and 509$_{frequency}$, respectively, illustrated in FIG. 5, or signals 409$_{laser}$ and 609$_{frequency}$, respectively, illustrated in FIG. 6.

In one example, the polarization frequency-shifting element may comprise a moving mirror that is controlled by the second drive signal to generate the first frequency shift by a Doppler shift, e.g., as illustrated by moving mirror 424 and equation 11. A means for controlling a moving mirror in the polarization frequency-shifting element with the second drive signal to generate the first frequency shift by a Doppler shift may be the transducer 425 and the ramp generator 408 and signal 409$_{frequency}$ illustrated in FIG. 4.

In one example, the polarization frequency-shifting element may comprise at least one acousto-optic modulator that is controlled by the second drive signal to generate the first frequency shift, e.g., as illustrated by acousto-optic modulator 504 in FIG. 5 or acousto-optic modulators 612 and 614 in FIG. 6. A means for controlling at least one acousto-optic modulator in the polarization frequency-shifting element with the second drive signal to generate the first frequency shift may be the ramp generator 408 and signals 509$_{frequency}$ or 609$_{frequency}$ illustrated in FIG. 5 or 6, respectively.

In some implementations, the reference surface in the one or more optical cavities may be stationary with respect to the test path during an acquisition time of the polarization phase sensor, e.g., as illustrated by reference mirror 151 and test mirror 156 in FIG. 1A or reference mirror 441 and test mirror 446 in FIG. 4.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An optical device for characterizing a test object, comprising:
   a tunable light source that is controlled to generate input light having a time varying frequency;
   a polarization frequency-shifting element that receives the input light and that is controlled to generate two beams that are orthogonally polarized and have respective frequencies that differ from each other by a first frequency shift;
   one or more optical cavities that receive the two beams, the one or more optical cavities comprising a reference path and a test path that are traversed by the two beams to produce a pair of reference beams and a pair of test beams, wherein an optical path difference between the test path and the reference path induces a second frequency shift on the pair of test beams that is a function of a static length of the optical path difference, the pair of test beams differ from the pair of reference beams in frequency by the second frequency shift, wherein the first frequency shift is controlled by the polarization frequency-shifting element to have a pre-defined relationship with respect to the second frequency shift; and
   a polarization phase sensor that receives the pair of reference beams combined with the pair of test beams and detects an interferogram produced by interference of a reference beam and test beam that are orthogonally polarized with respect to each other and that have frequency shift magnitudes with the pre-defined relationship.

2. The optical device of claim 1, wherein the one or more optical cavities is a Fizeau optical cavity, wherein the reference path and the test path are on a common optical axis.

3. The optical device of claim 1, wherein the tunable light source is a tunable laser.

4. The optical device of claim 1, wherein the tunable light source is a broadband light source and tunable narrowband filter.

5. The optical device of claim 1, wherein the pre-defined relationship is a match between the first frequency shift and the second frequency shift that produces an interference fringe contrast in the interferogram that is at least 5% over an integration time of the polarization phase sensor.

6. The optical device of claim 1, wherein the pair of reference beams comprises a first reference beam having the time varying frequency and a second reference beam having the time varying frequency and the first frequency shift, and the pair of test beams comprises a first test beam having the time varying frequency and the second frequency shift, and a second test beam having the time varying frequency and the first frequency shift and the second frequency shift, wherein the polarization phase sensor detects the interferogram produced by interference of the second reference beam and the first test beam.

7. The optical device of claim 1, wherein the tunable light source is controlled with a first drive signal and the polarization frequency-shifting element is controlled by a second drive signal to generate the first frequency shift with the pre-defined relationship with respect to the second frequency shift.

8. The optical device of claim 7, wherein the polarization frequency-shifting element comprises a moving minor that is controlled by the second drive signal to generate the first frequency shift by a Doppler shift.

9. The optical device of claim 7, wherein the polarization frequency-shifting element comprises at least one acousto-optic modulator that is controlled by the second drive signal to generate the first frequency shift.

10. The optical device of claim 1, wherein a reference surface in the one or more optical cavities is stationary with respect to a test surface during an acquisition time of the polarization phase sensor to produce the static length of the optical path difference between the test path and the reference path.

11. The optical device of claim 1, wherein the interferogram is produced by interference of the reference beam having the first frequency shift and the test beam having the second frequency shift.

12. A method of characterizing a test object with an optical device, comprising:
   generating input light having a time varying frequency with a tunable light source;
   generating from the input light two beams that are orthogonally polarized and have respective frequencies that differ from each other by a first frequency shift with a polarization frequency-shifting element that receives the input light;

receiving the two beams with one or more optical cavities, the one or more optical cavities comprising a reference path and a test path that are traversed by the two beams to produce a pair of reference beams and a pair of test beams, wherein an optical path difference between the test path and the reference path induces a second frequency shift on the pair of test beams that is a function of a static length of the optical path difference, wherein the first frequency shift is controlled by the polarization frequency-shifting element to have a pre-defined relationship with respect to the second frequency shift; and receiving with a polarization phase sensor the pair of reference beams combined with the pair of test beams and detecting an interferogram produced by interference of a reference beam and test beam that are orthogonally polarized with respect to each other and that have frequency shift magnitudes with the pre-defined relationship.

13. The method of claim 12, wherein the one or more optical cavities is a Fizeau optical cavity, wherein the reference path and the test path are on a common optical axis.

14. The method of claim 12, wherein the tunable light source is one of a tunable laser or a broadband light source with a tunable narrowband filter.

15. The method of claim 12, wherein the pre-defined relationship is a match between the first frequency shift and the second frequency shift that produces an interference fringe contrast in the interferogram that is at least 5% over an integration time of the polarization phase sensor.

16. The method of claim 12, wherein the pair of reference beams comprises a first reference beam having the time varying frequency and a second reference beam having the time varying frequency and the first frequency shift, and the pair of test beams comprises a first test beam having the time varying frequency and the second frequency shift, and a second test beam having the time varying frequency and the first frequency shift and the second frequency shift, wherein detecting the interferogram comprises detecting the interferogram produced by interference of the second reference beam and the first test beam with the polarization phase sensor.

17. The method of claim 12, further comprising controlling the tunable light source with a first drive signal and controlling the polarization frequency-shifting element with a second drive signal to generate the first frequency shift with the pre-defined relationship with respect to the second frequency shift.

18. The method of claim 17, wherein the polarization frequency-shifting element comprises a moving minor that is controlled by the second drive signal to generate the first frequency shift by a Doppler shift.

19. The method of claim 17, wherein the polarization frequency-shifting element comprises at least one acousto-optic modulator that is controlled by the second drive signal to generate the first frequency shift.

20. The method of claim 12, wherein a reference surface in the one or more optical cavities is stationary with respect to a test surface during an acquisition time of the polarization phase sensor to produce the static length of the optical path difference between the test path and the reference path.

21. The method of claim 12, wherein detecting the interferogram comprises detecting the interferogram produced by the reference beam having the first frequency shift and the test beam having the second frequency shift.

22. An optical device for characterizing a test object, comprising:

means for generating input light having a time varying frequency;

means for generating from the input light two beams that are orthogonally polarized and have respective frequencies that differ from each other by a first frequency shift;

means for receiving the two beams with one or more optical cavities, the one or more optical cavities comprising a reference path and a test path that are traversed by the two beams to produce a pair of reference beams and a pair of test beams, wherein an optical path difference between the test path and the reference path induces a second frequency shift on the pair of test beams that is a function of a static length of the optical path difference, wherein the first frequency shift is controlled to have a pre-defined relationship with respect to the second frequency shift; and means for receiving the pair of reference beams combined with the pair of test beams and detecting an interferogram produced by interference of a reference beam and test beam that are orthogonally polarized with respect to each other and that have frequency shift magnitudes with the pre-defined relationship.

* * * * *

UNITED STATES PATENT AND TRADEMARK OFFICE
CERTIFICATE OF CORRECTION

PATENT NO. : 12,216,051 B2  
APPLICATION NO. : 17/581534  
DATED : February 4, 2025  
INVENTOR(S) : James Millerd Page 1 of 1

It is certified that error appears in the above-identified patent and that said Letters Patent is hereby corrected as shown below:

In the Claims

Claim 8, Column no 22 Line no 45, "frequency-shifting element comprises a moving minor" to read as, "frequency-shifting element comprises a moving mirror."

Claim 18, Column no 24 Line no 05, "frequency-shifting element comprises a moving minor" to read as, "frequency-shifting element comprises a moving mirror."

Signed and Sealed this  
Eighteenth Day of March, 2025

Coke Morgan Stewart  
*Acting Director of the United States Patent and Trademark Office*